United States Patent
Morita

(10) Patent No.: US 11,273,412 B2
(45) Date of Patent: Mar. 15, 2022

(54) HOLLOW FIBER MEMBRANE MODULE AND FILTRATION METHOD

(71) Applicant: ASAHI KASEI KABUSHIKI KAISHA, Tokyo (JP)

(72) Inventor: Naoyoshi Morita, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 16/483,942

(22) PCT Filed: Feb. 10, 2017

(86) PCT No.: PCT/JP2017/004885
§ 371 (c)(1),
(2) Date: Aug. 6, 2019

(87) PCT Pub. No.: WO2018/146788
PCT Pub. Date: Aug. 16, 2018

(65) Prior Publication Data
US 2019/0388841 A1    Dec. 26, 2019

(51) Int. Cl.
*B01D 63/02*    (2006.01)

(52) U.S. Cl.
CPC .......... *B01D 63/02* (2013.01); *B01D 2313/23* (2013.01)

(58) Field of Classification Search
CPC .... B01D 63/02; B01D 63/022; B01D 63/024; B01D 63/021; B01D 63/043;
(Continued)

(56) References Cited

U.S. PATENT DOCUMENTS

| | | | |
|---|---|---|---|
| 5,033,269 A * | 7/1991 | Smith | F02B 41/10 60/607 |
| 5,192,478 A * | 3/1993 | Caskey | B01D 63/022 156/94 |

(Continued)

FOREIGN PATENT DOCUMENTS

| | | |
|---|---|---|
| CN | 1197408 | 10/1998 |
| CN | 1859966 | 11/2006 |

(Continued)

OTHER PUBLICATIONS

International Search Report issued in International Bureau of WIPO Patent Application No. PCT/JP2017/004885, dated May 16, 2017.
(Continued)

*Primary Examiner* — Ana M Fortuna
(74) *Attorney, Agent, or Firm* — Greenblum & Bernstein, P.L.C.

(57) ABSTRACT

A first adhesion-fixing-portion adhesively fixing hollow fiber membranes together and a hollow fiber membrane bundle and an inner wall of a housing together at an open end of the hollow fiber membranes, and a second adhesion-fixing-portion adhesively fixing the hollow fiber membranes together and the hollow fiber membrane bundle and the inner wall of the housing together at a closed end of the hollow fiber membranes are included. At least one of the second adhesion-fixing-portion and the housing around the second adhesion-fixing-portion has at least one through-hole for introducing liquid fed from the outside of the second adhesion-fixing-portion to a space in the housing. The total area of an opening or openings of at least one through-hole provided outside an outer perimeter of the hollow fiber membrane bundle is 80% or more of the total area of an opening or openings of all of the at least one through-hole.

17 Claims, 8 Drawing Sheets

(58) Field of Classification Search
CPC .............. B01D 2319/04; B01D 63/04; B01D 2313/10; B01D 2323/42; B01D 2313/06; B01D 61/18
See application file for complete search history.

(56) References Cited

U.S. PATENT DOCUMENTS

| | | | | |
|---|---|---|---|---|
| 5,470,469 | A * | 11/1995 | Eckman | B01D 63/02 210/321.8 |
| 6,171,496 | B1 * | 1/2001 | Patil | B01D 69/125 210/484 |
| 6,331,248 | B1 | 12/2001 | Taniguchi et al. | |
| 8,197,688 | B2 * | 6/2012 | Sakashita | B01D 63/02 210/321.8 |
| 9,764,288 | B2 * | 9/2017 | Johnson | B01D 63/02 |
| 2003/0136746 | A1 * | 7/2003 | Behmann | B01D 63/026 210/771 |
| 2005/0126982 | A1 * | 6/2005 | Stachera | B01D 63/022 210/321.88 |
| 2007/0039868 | A1 | 2/2007 | Ishibashi | |
| 2009/0218274 | A1 * | 9/2009 | Sakashita | C02F 1/444 210/321.6 |
| 2015/0053601 | A1 | 2/2015 | Shiki et al. | |
| 2015/0182916 | A1 * | 7/2015 | Kanai | C02F 1/444 210/321.89 |
| 2015/0197431 | A1 | 7/2015 | Shiki | |
| 2016/0107125 | A1 * | 4/2016 | Kobayashi | B01D 63/04 210/232 |
| 2016/0317972 | A1 * | 11/2016 | Matsumoto | B01D 63/02 |
| 2018/0229187 | A1 * | 8/2018 | Fan | B01D 63/02 |
| 2019/0015786 | A1 * | 1/2019 | Shimura | B01D 65/02 |
| 2019/0160434 | A1 * | 5/2019 | Shevitz | B01D 63/021 |
| 2020/0171428 | A1 * | 6/2020 | Ranjan | B01D 53/30 |
| 2020/0171438 | A1 * | 6/2020 | Kasai | B01D 63/02 |
| 2020/0206689 | A1 * | 7/2020 | Kobayashi | B01D 69/08 |
| 2021/0039047 | A1 * | 2/2021 | Yamane | B01D 63/02 |

FOREIGN PATENT DOCUMENTS

| | | |
|---|---|---|
| CN | 202343103 | 7/2012 |
| CN | 104159655 | 11/2014 |
| CN | 104772041 | 7/2015 |
| CN | 105142764 | 12/2015 |
| JP | 60-68007 A | 4/1985 |
| JP | 2-2832 A | 1/1990 |
| JP | 3-8350 Y2 | 2/1991 |
| JP | 4-26020 | 3/1992 |
| JP | 7-19550 Y2 | 5/1995 |
| JP | 11-333265 A | 12/1999 |
| JP | 4536008 B2 | 6/2010 |
| JP | 2012-205981 A | 10/2012 |
| JP | 2013-99703 A | 5/2013 |
| WO | 2014/175409 A1 | 10/2014 |

OTHER PUBLICATIONS

Written Opinion issued in International Bureau of WIPO Patent Application No. PCT/JP2017/004885, dated May 16, 2017.
R. Yao et al., Pharmaceutical Engineering Principle and Equipment, Higher Education Press, Jan. 2007, p. 124 and an English translation thereof.

* cited by examiner

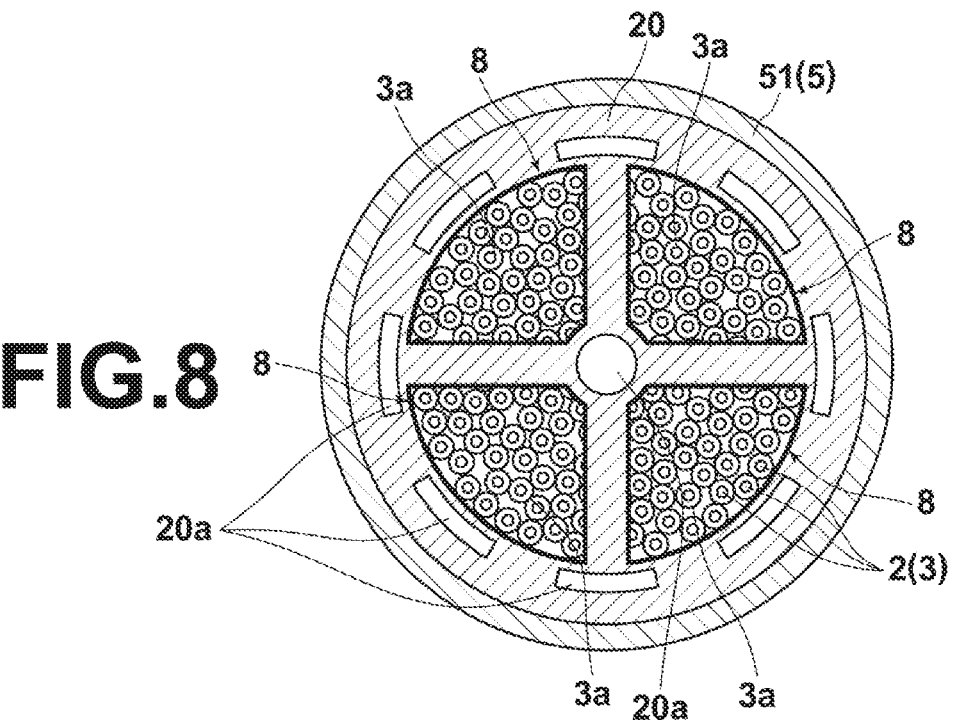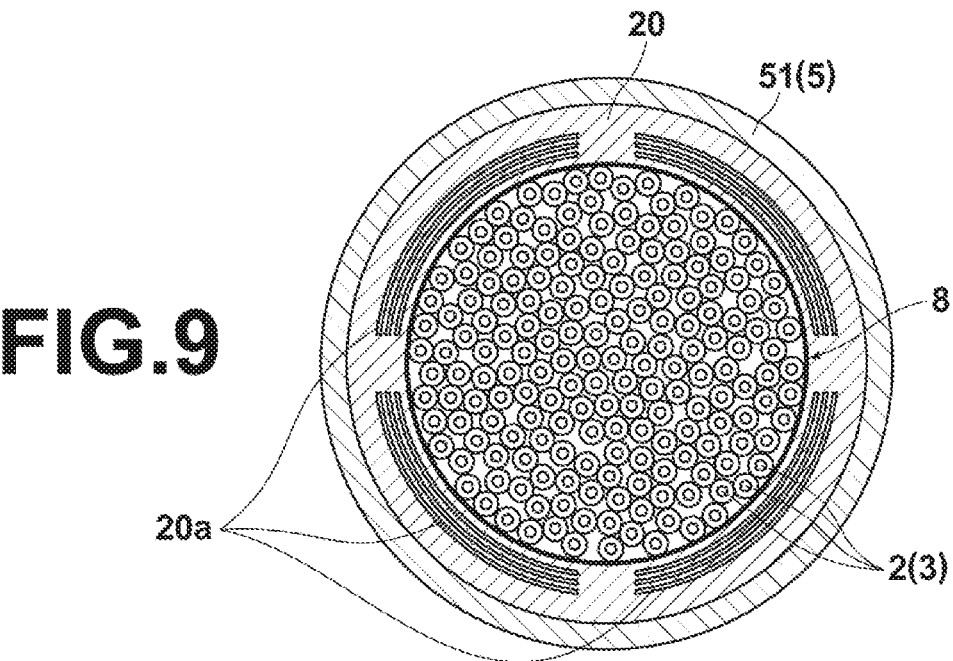

HOLLOW FIBER MEMBRANE MODULE AND FILTRATION METHOD

TECHNICAL FIELD

The present disclosure relates to a hollow fiber membrane module and a filtration method, and particularly to a hollow fiber membrane module and a filtration method preferably used in a filtration apparatus for removing endotoxin from water clarified by a pure water production apparatus.

BACKGROUND ART

In recent years, ultrafiltration methods are widely used to produce water to be used by pharmaceutical companies. The ultrafiltration method purifies water by a reverse osmosis membrane, an ultrafiltration membrane that can remove substance having a molecular weight of 6000 or more, or a production system using them in combination. Therefore, there is a demand for a more reliable ultrafiltration membrane module with a low risk of leakage, and in which a high design filtration flux is settable and a low running cost is achievable.

Generally, a hollow fiber ultrafiltration membrane module used for this purpose includes several hundreds to thousands of hollow fiber membranes having outer diameters of 0.1 mm to 2 mm and a molecular weight cut-off of 6000 or less, and which are housed in a tubular housing with a length of 200 to 1200 mm and adhesively fixed to the inner wall of the housing by resin at both ends thereof. Both ends of the hollow fiber membranes are open, and raw water is guided into hollow portions of the hollow fiber membranes, and filtrate guided to the outer surfaces of the hollow fiber membranes is discharged from a nozzle provided on a side surface of the housing. This is an inside-out cross-flow filtration method or an inside-out dead-end filtration method, in which bacteria propagation is prevented by regularly sterilizing the whole system by using hot water, and a decrease in the filtration flux of the hollow fiber membrane is suppressible.

Normally, a relatively high filtration flux is settable for a hollow fiber membrane module, but as the set filtration flux becomes higher, the more filtrate concentrates at a nozzle for discharge on a side surface of the housing due to the structure of the inside-out hollow filter membrane module, and suction force acts on the hollow fiber membrane in the vicinity of the nozzle for discharge, such that a tendency of breakage increases, and that has caused a problem that the hollow fiber membrane becomes breakable.

To increase the filtration flux of a hollow fiber membrane module, if hollow fiber membranes themselves are formed to have smaller diameters, and thereby increasing the number of the hollow fiber membranes loaded into the housing, or if the thickness of the hollow fiber membranes is made thinner to reduce filtration resistance, and thereby improving the filtration ability, the breaking strength of the hollow fiber membranes also drops, and thereby increasing a risk of breakage. Thus, an increase of the filtration flux by use of the inside-out cross-flow filtration method or the inside-out dead-end filtration method was limited.

Further, the filtration flux of a hollow fiber membrane module may be increased by use of an outside-in hollow fiber membrane, as described in Japanese Patent No. 4536008.

SUMMARY

Technical Problem

However, when the outside-in hollow fiber membrane module as described in Japanese Patent No. 4536008 is used, if an operation at a high filtration flux is attempted, hollow fiber membranes vibrate in the vicinities of both ends thereof by a flow of water to be treated into the housing, and a problem of breaking the hollow fiber membranes arises. Particularly, in the case of the hollow fiber membrane module described in Japanese Patent No. 4536008, water to be treated is fed through through-holes formed in an adhesion fixing portion, where the hollow fiber membranes are adhesively fixed at their ends. However, since the through-holes are provided only inside the outer perimeter of the hollow fiber membrane bundle, hollow fiber membranes in the vicinities of the through-holes vibrate by a flow of water to be treated fed into the through-holes, and a problem that the membranes are breakable arises.

In view of the foregoing circumstances, the present disclosure tries to provide a hollow fiber membrane module and a filtration method that can increase a filtration flux while suppressing breakage of hollow fiber membranes.

The hollow fiber membrane module of the present disclosure is a hollow fiber membrane module including a hollow fiber membrane bundle of a plurality of hollow fiber membranes bundled together, and having closed hollow portions at an end and open hollow portions at the other end, a tubular housing that houses the hollow fiber membrane bundle, a first adhesion fixing portion that adhesively fixes the hollow fiber membranes together and the hollow fiber membrane bundle and an inner wall of the housing together at the open end of the hollow fiber membranes, and a second adhesion fixing portion that adhesively fixes the hollow fiber membranes together and the hollow fiber membrane bundle and the inner wall of the housing together at the closed end of the hollow fiber membranes, and at least one of the second adhesion fixing portion and the housing around the second adhesion fixing portion has at least one through-hole for introducing liquid fed from the outside of the second adhesion fixing portion to a space between the first adhesion fixing portion and the second adhesion fixing portion in the housing, and the total area of an opening or openings of at least one through-hole provided outside an outer perimeter of the hollow fiber membrane bundle is 80% or more of the total area of an opening or openings of all of the at least one through-hole.

Further, in the hollow fiber membrane module of the present embodiment, a protective member may be provided between the hollow fiber membrane bundle and the at least one through-hole provided outside the outer perimeter of the hollow fiber membrane bundle.

Further, in the hollow fiber membrane module of the present embodiment, it is preferable that the protective member wraps the outer perimeter of the hollow fiber membrane bundle.

Further, in the hollow fiber membrane module of the present embodiment, it is preferable that the protective member is fixed at at least one of the first adhesion fixing portion and the second adhesion fixing portion.

Further, in the hollow fiber membrane module of the present embodiment, the protective member may be fixed by the first adhesion fixing portion.

Further, in the hollow fiber membrane module of the present embodiment, the protective member may be fixed by the second adhesion fixing portion.

Further, in the hollow fiber membrane module of the present embodiment, the at least one through-hole may be provided only outside the outer perimeter of the hollow fiber membrane bundle.

Further, in the hollow fiber membrane module of the present embodiment, the through-holes may be provided outside the outer perimeter of the hollow fiber membrane bundle and also in a central part of the hollow fiber membrane bundle having no hollow fiber membrane arranged therein.

Further, in the hollow fiber membrane module of the present embodiment, it is preferable that a central protective member is provided around the at least one through-hole provided in the central part of the hollow fiber membrane bundle.

Further, in the hollow fiber membrane module of the present embodiment, it is preferable that the central protective member extends from the second adhesion fixing portion to the first adhesion fixing portion.

Further, in the hollow fiber membrane module of the present embodiment, the plurality of through-holes may be provided at regular intervals along the outer perimeter of the hollow fiber membrane bundle.

Further, in the hollow fiber membrane module of the present embodiment, the opening of the through-hole may have a shape extending along the outer perimeter of the hollow fiber membrane bundle.

Further, in the hollow fiber membrane module of the present embodiment, it is preferable that the protective member is a mesh member in tubular shape.

A first filtration method of the present disclosure uses the hollow fiber membrane module of the present disclosure, and includes feeding liquid, through the at least one through-hole, into the space between the first adhesion fixing portion and the second adhesion fixing portion in the housing, and causing filtrate obtained by filtration by the hollow fiber membranes to flow out from the open hollow portions of the hollow fiber membranes.

A second filtration method of the present disclosure uses a hollow fiber membrane module in which a hollow fiber membrane bundle of a plurality of hollow fiber membranes bundled together is housed in a housing, and the method includes feeding liquid to be treated from the outside of each of the hollow fiber membranes, and obtaining filtrate from a hollow portion of each of the hollow fiber membranes, and the liquid to be treated is fed, in a longitudinal direction of the hollow fiber membrane bundle, in an area outside the outer perimeter of the hollow fiber membrane bundle.

Further, in the second filtration method of the present disclosure, the liquid to be treated may be fed at a plurality positions outside the outer perimeter of the hollow fiber membrane bundle.

Further, in the second filtration method of the present disclosure, the liquid to be treated may pass through each of the hollow fiber membranes after passing through a protective member provided outside the outer perimeter of the hollow fiber membrane bundle.

Further, in the second filtration method of the present disclosure, the liquid to be treated may pass through the protective member after passing through a through-hole or through-holes formed in an adhesion fixing portion that adhesively fixes the hollow fiber membranes together and the hollow fiber membrane bundle and an inner wall of the housing together at an end of the hollow fiber membrane bundle.

Further, in the second filtration method of the present disclosure, the liquid to be treated may be fed from a conduit formed outside the adhesion fixing portion.

Advantageous Effects of Disclosure

According to the hollow fiber membrane module and the first filtration method of the present disclosure, a hollow fiber membrane module includes a first adhesion fixing portion that adhesively fixes the hollow fiber membranes together and the hollow fiber membrane bundle and an inner wall of the housing together at the open end of the hollow fiber membranes, and a second adhesion fixing portion that adhesively fixes the hollow fiber membranes together and the hollow fiber membrane bundle and the inner wall of the housing together at the closed end of the hollow fiber membranes. In the module, at least one through-hole for introducing liquid fed from the outside of the second adhesion fixing portion to a space in the housing is provided in at least one of the second adhesion fixing portion and the housing around the second adhesion fixing portion. Further, the through-holes are provided in such a manner that the total area of an opening or openings of at least one through-hole provided outside an outer perimeter of the hollow fiber membrane bundle is 80% or more of the total area of an opening or openings of all of the at least one through-hole. Therefore, it is possible to increase a filtration flux while suppressing breakage of hollow fiber membranes.

Further, according to the second filtration method of the present disclosure, the filtration method uses a hollow fiber membrane module in which a hollow fiber membrane bundle of a plurality of hollow fiber membranes bundled together is housed in a housing, and the method includes feeding liquid to be treated from the outside of each of the hollow fiber membranes, and obtaining filtrate from a hollow portion of each of the hollow fiber membranes. Since the liquid to be treated is fed, in a longitudinal direction of the hollow fiber membrane bundle, in an area outside the outer perimeter of the hollow fiber membrane bundle, it is possible to increase a filtration flux while suppressing breakage of hollow fiber membranes.

BRIEF DESCRIPTION OF THE DRAWINGS

FIG. 8 A diagram illustrating another embodiment of through-holes

FIG. 9 A diagram illustrating another embodiment of through-holes

DESCRIPTION OF EMBODIMENTS

Figure 1:
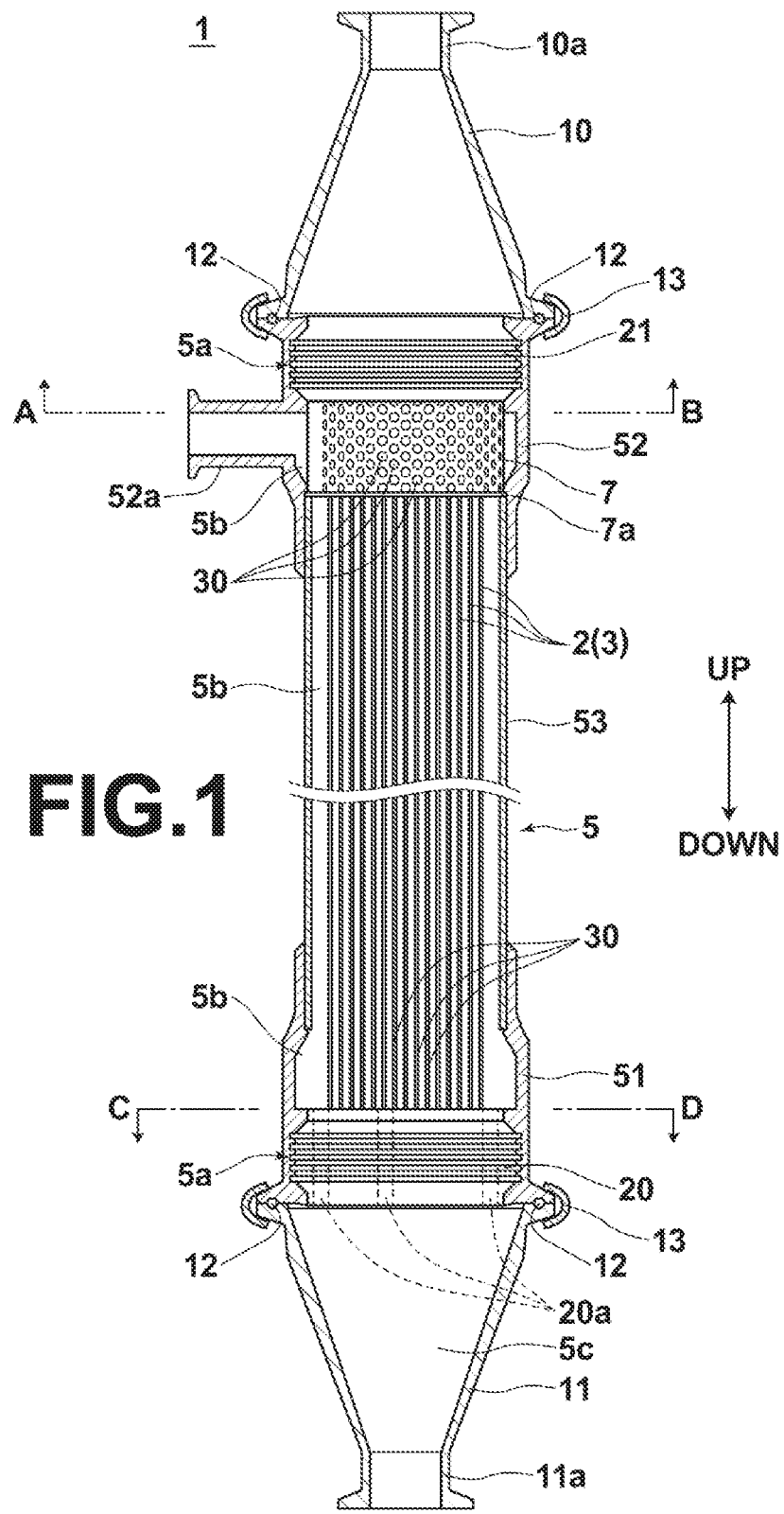
FIG. 1 A schematic diagram illustrating the configuration of a hollow fiber membrane module according to an embodiment of the present disclosure FIG. 2 A cross-section of the hollow fiber membrane module at line C-D illustrated in FIG. 1.

Next, with reference to drawings, an embodiment of a hollow fiber membrane module according to the present disclosure will be described. The hollow fiber membrane module of the present embodiment is used in various fields, such as water and sewage service, food industries, general industries, medicine and physics and chemistry. In particular, it is used preferably as a final filtration membrane module in a sterilized water production apparatus in medical, pharmaceutical and food industries. FIG. 1 is a schematic diagram illustrating the hollow fiber membrane module of the present embodiment. In FIG. 1, the vertical direction of the module is indicated by an arrow. In the following descriptions, the vertical direction indicated in FIG. 1 is regarded as the vertical direction of the hollow fiber membrane module 1.

As illustrated in FIG. 1, the hollow fiber membrane module 1 of the present embodiment includes a hollow fiber membrane bundle 3 including a plurality of hollow fiber membranes 2 bundled together and a tubular housing 5 for housing the hollow fiber membrane bundle 3. In FIG. 1, as for the housing 5 and caps 10, 11, which will be described later, cross-sections are illustrated by removing their front halves.

As the hollow fiber membrane 2, a reverse osmosis membrane, a nanofiltration membrane, an ultrafiltration membrane, and a microfiltration membrane may be used. The material of the hollow fiber membrane is not particularly limited, and polysulfone, polyethersulfone, polyacrylonitrile, polyimide, polyetherimide, polyamide, poly etherketone, polyetheretherketone, polyethylen, polypropylene, poly(4-methyl pentene), ethylene-vinylalcohol copolymer, cellulose, cellulose acetate, polyvinylidene fluoride, ethylene-tetrafluoroethylene copolymer, polytetrafluoroethylene and the like may be used, and composite materials thereof may also be used.

Further, as for the shape of the hollow fiber membrane, the inner diameter is preferably 50 μm to 3000 μm, and more preferably 500 to 2000 μm. Further, a hollow fiber membrane with the ratio of inner diameter/outer diameter of 0.3 to 0.8 is preferably used.

Caps 10, 11 for connecting piping are provided respectively at openings of both ends of the housing 5, and conduits 10a. 11a to which the piping is to be connected are formed in the caps 10, 11, and the caps 10, 11 for connecting piping are fixed and attached to the housing 5 by clamps 13. Ring-shaped grooves are formed on surfaces of the ends of the caps 10, 11 facing the housing 5 and surfaces of the ends of the housing 5 facing the caps 10, 11, and these grooves hold sanitary gaskets 12 therebetween. These sanitary gaskets 12 seal space between both ends of the housing and the caps 10, 11.

The housing 5 is configured by a first tubular member 51, a second tubular member 52 integrally molded with a nozzle 52a, and a straight-pipe-shaped third tubular member 53 arranged between the first tubular member 51 and the second tubular member 52, and which are bonded together. The nozzle 52a is provided on a side surface at an end of the housing 5 in such a manner to project in a direction orthogonal to the longitudinal direction of the housing 5. The nozzle 52a discharges concentrate during an outside-in filtration process.

The hollow fiber membrane module 1 is set upright in such a manner that its longitudinal direction is oriented in a vertical direction and that the nozzle 52a is positioned in an upper part with respect to the vertical direction.

Further, as illustrated in FIG. 1, a rectifying tube 7 is attached to an upper end (near the nozzle 52a) of the hollow fiber membrane bundle 3. The rectifying tube 7 is formed in tubular shape, and provided between an opening of the nozzle 52a near the inner wall of the housing 5 and the hollow fiber membrane bundle 3 in such a manner that the rectifying tube 7 surrounds the outer perimeter of the hollow fiber membrane bundle 3. The rectifying tube 7 is provided to secure a gap between the hollow fiber membrane bundle 3 and the inner wall of the housing 5 in the vicinity of the nozzle 52a. Accordingly, when concentrate is discharged from the nozzle 52a, a swing of the hollow fiber membrane 2 toward the nozzle 52a is suppressible, and breakage of the hollow fiber membrane 2 is suppressible.

As illustrated in FIG. 1, a plurality of through holes 30 are provided on the rectifying tube 7. It is desirable that the through holes 30 of the rectifying tube 7 are formed in an area other than an area facing the opening of the nozzle 52a near the inner wall of the housing 5, and not formed in the area facing the opening.

The rectifying tube 7 includes a flange 7a, and the rectifying tube 7 is positioned by holding the flange 7a by portions of the second tubular member 52 and the third tubular member 53 at which they are bonded together. The upper end of the rectifying tube 7 is adhesively fixed in an adhesion fixing portion 21 (corresponding to the first adhesion fixing portion of the present disclosure), which will be described later.

At both ends of the hollow fiber membrane bundle 3, adhesion fixing portions 20, 21 are formed, which adhesively fix each hollow fiber membrane 2 together and the hollow fiber membrane bundle 3 and the inner wall of the housing 5 together by potting material. Ring-shaped uneven portions 5a are formed on inner walls of both ends of the housing 5, and ring-shaped uneven structures are formed on side surfaces of the adhesion fixing portions 20, 21 by a flow of the potting material into grooves of these ring-shaped uneven portions 5a. It is possible to increase the area of adhesion portions between the housing 5 and the adhesion fixing portions 20, 21 by forming the ring-shaped uneven portions 5a on the inner wall of the housing in this manner, and higher adhesion strength is achievable.

As the potting material, polymer materials, such as epoxy resin, vinyl ester resin, urethane resin, unsaturated polyester resin, olefin-based polymer, silicon resin and fluorine-containing resin, are desirable, and one of these polymer materials may be used alone, or a plurality of the polymer materials may be used in combination. Further, the adhesion fixing portions 20, 21 made of these potting materials need to have pressure resistance so as to withstand a pressure difference between a primary side and a secondary side induced by pressurization during filtration. Therefore, it is desirable that they have appropriate hardness. Meanwhile, it is desirable to use a potting material having suitable flexibility so as to securely prevent, for a longer period of time, the hollow fiber membranes 2 from being broken by a flow of fluid during physical washing.

An area 5b (hereinafter, referred to as an outside area) into which water to be treated flows is formed outside the hollow fiber membrane 2 between the adhesion fixing portion 20 and the adhesion fixing portion 21 formed at both ends of the hollow fiber membrane bundle 3.

Figure 2:
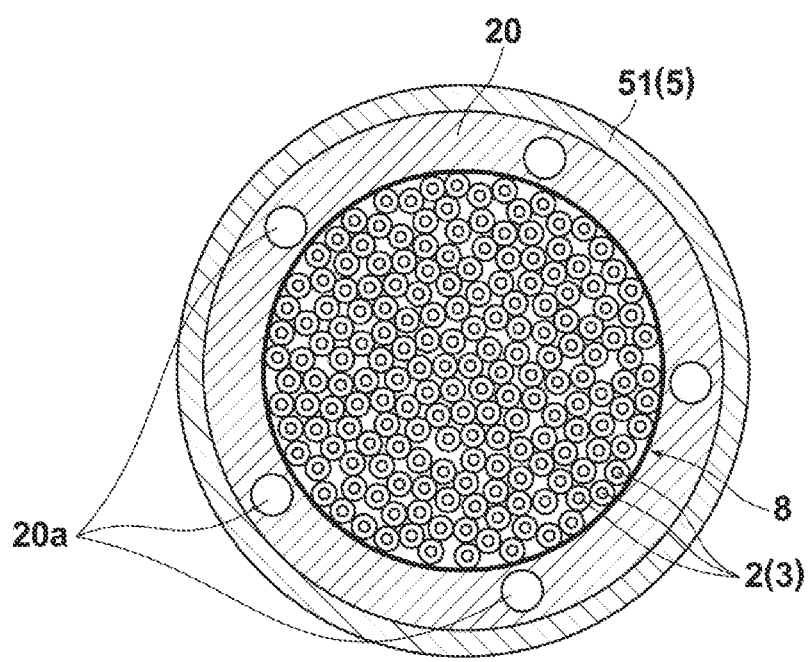

Further, as illustrated in FIG. 1, a plurality of through-holes 20a are formed in the adhesion fixing portion 20, which is located in a lower part when the hollow fiber membrane module 2 is set upright in the vertical direction. FIG. 2 is a cross-section of the hollow fiber membrane module 1 at line C-D of FIG. 1.

The through-holes 20a are formed in the longitudinal direction of the housing 5 in such a manner to be parallel with each other, and they allow the aforementioned outside area 5b and an exterior area 5c opposite to the outside area 5b with the adhesion fixing portion 20 therebetween to communicate with each other. In the present embodiment, as illustrated in FIG. 2, the plurality of through-holes 20a are formed outside the outer perimeter of the hollow fiber membrane bundle 3 and in the adhesion fixing portion 20 between a protective member 8, which will be described later, and the inner wall of the housing 5. Here, the outer perimeter of the hollow fiber membrane bundle 3 is represented by an imaginary line connecting the outermost hollow fiber membranes 2 of the hollow fiber membrane bundle 3, and which are next to each other. Further, it is desirable that the through-holes 20a are arranged at regular intervals along the outer perimeter of the hollow fiber membrane bundle 3, as illustrated in FIG. 2.

Further, a hollow portion of each of the hollow fiber membranes 2 is closed at an end where the through-holes 20a are provided, and a hollow portion of each of the hollow fiber membranes 2 is open at the other end, which is opposite to the end where the through-holes 20a are provided. When filtration is to be performed, water to be treated (liquid to be treated) flows in from the conduit 11a of the cap 11 provided outside the adhesion fixing portion 20, and the water to be treated passes through the through-holes 20a, and fed into the outside area 5b. In other words, the water to be treated, which has flowed in from the conduit 11a, is fed in a direction along the longitudinal direction of the hollow fiber membranes 3 in an area outside the outer perimeter of the hollow fiber membrane bundle 3.

In an outside-in filtration method using a conventional hollow fiber membrane module, water to be treated is fed from a nozzle provided on a side surface of the housing, in other words, water to be treated is fed in a direction perpendicular to the longitudinal direction of the hollow fiber membrane bundle. Therefore, the hollow fiber membranes swung by water pressure while the water to be treated was fed, and there was a risk of damaging the hollow fiber membrane. In contrast, in the outside-in filtration method using the hollow fiber membrane module 1 of the present embodiment, the water to be treated is fed in a direction along the longitudinal direction of the hollow fiber membrane 3 in an area outside the outer perimeter of the hollow fiber membrane bundle 3. Therefore, it is possible to suppress a swing of the hollow fiber membranes 2 caused by feeding the water to be treated, and to suppress breakage of the hollow fiber membranes 2.

Further, the water to be treated, which has been fed into the outside area 5b, passes through the protective member 8, and after then, penetrates into each of the hollow fiber membranes 2 through its outer surface, and filtrate, which has passed through a hollow portion of each of the hollow fiber membranes 2, flows out from a conduit 10a of the cap 10, and concentrate flows out from the nozzle 52a.

Figure 3:
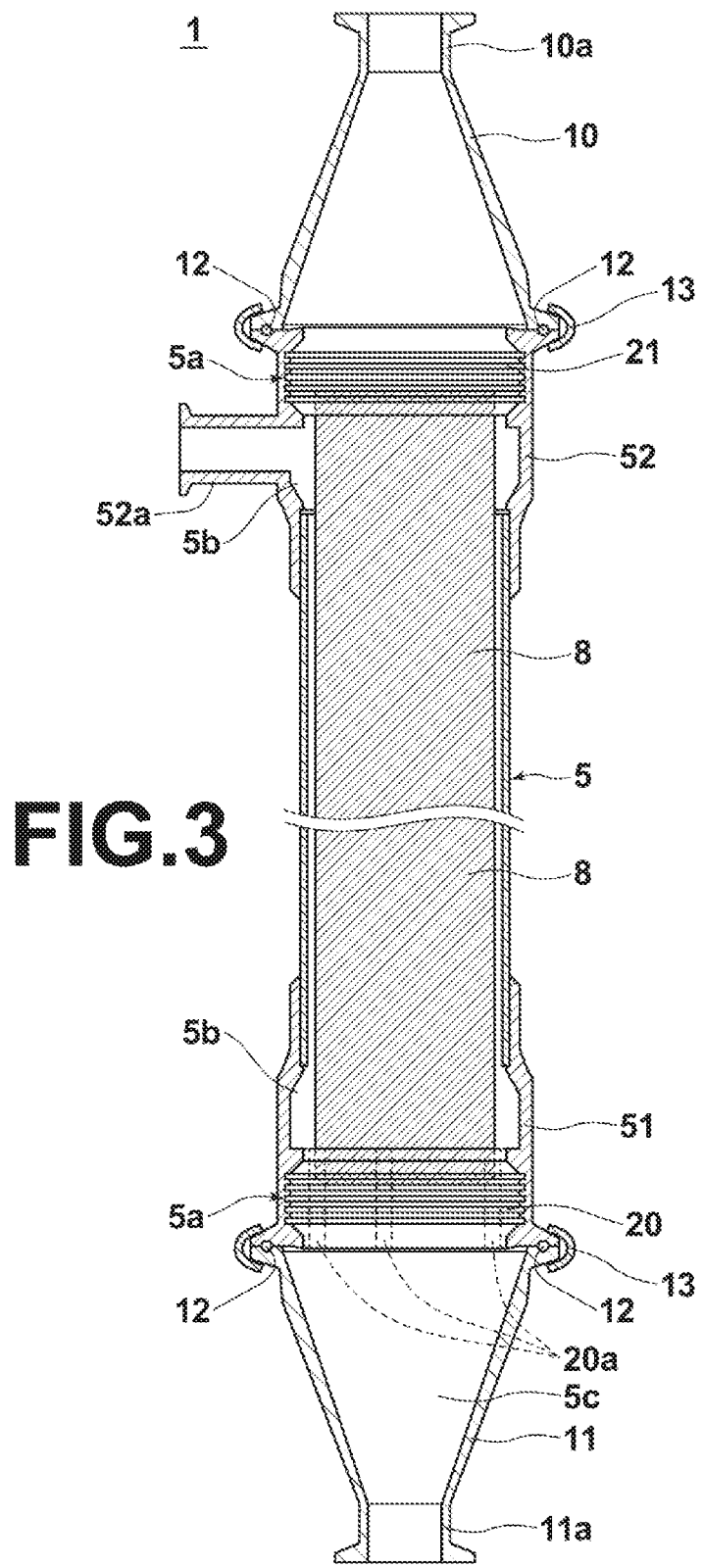
FIG. 3 A schematic diagram illustrating the configuration of a protective member in an embodiment of a hollow fiber membrane module of the present disclosure FIG. 4 A cross-section of the hollow fiber membrane module at line A-B illustrated in FIG. 1.

Further, the hollow fiber membrane module 1 includes a tubular protective member 8 provided in such a manner to wrap the outer perimeter surface of the hollow fiber membrane bundle 3. FIG. 3 illustrates an external view of the protective member 8 provided in the housing 5. In FIG. 3, the hollow fiber membrane bundle 3 and the rectifying tube 7, which are illustrated in FIG. 1, are omitted. Meanwhile, in FIG. 1, the protective member 8 is omitted.

As illustrated in FIG. 3, in the present embodiment, the protective member 8 is provided in such a manner to wrap substantially the whole outer perimeter surface of the hollow fiber membrane bundle 3. The protective member 8 used in the present embodiment is a mesh member in tubular shape, as illustrated in FIG. 3, and has flexibility. As the material the mesh protective member 8, it is desirable to use heat-resistant material, such as PFA (tetrafluoroethylene-perfluoro alkyl vinyl ether copolymer), FEP (tetrafluoroethylene-hexafluoropropylene copolymer (4.6 fluoride)), ETFE (tetrafluoroethylene-ethylene copolymer), PTFE (polytetrafluoroethylene (4 fluoride)) and polysulfone.

Figure 4:
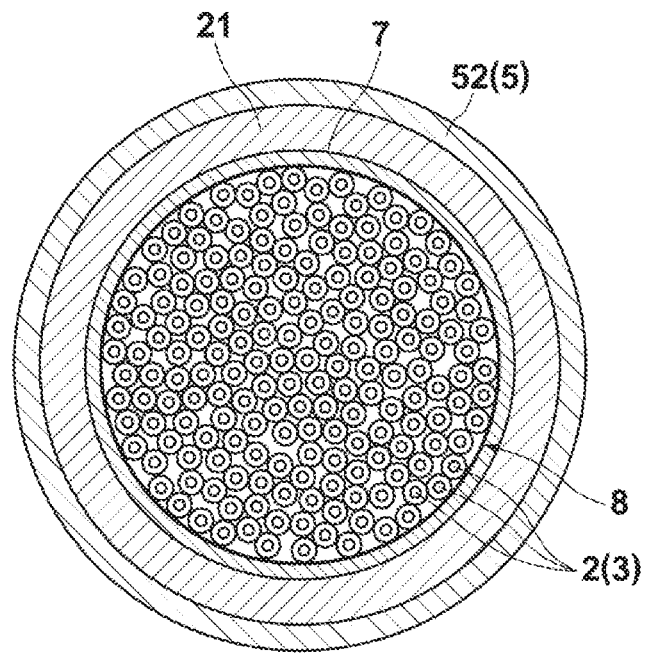

Both ends of the protective member 8 are located in the adhesion fixing portions 20, 21, respectively, and fixed by the adhesion fixing portions 20, 21. FIG. 4 is a cross-section of the hollow fiber membrane module 1 at line A-B of FIG. 1. It is desirable that the protective member 8 is provided in such a manner to be in close contact with the outer perimeter surface of the hollow fiber membrane bundle 3 at least at both ends of the hollow fiber membrane bundle 3.

Next, a method for producing the hollow fiber membrane module 1 of the above embodiment will be described in detail.

First, a hollow fiber membrane bundle 3 is made by arranging a predetermined number of hollow fiber membranes 2 as a bundle. Next, an opening at one end of each of the hollow fiber membranes 2 of the hollow fiber membrane bundle 3 is sealed by sealant. As the sealant, for example, gypsum may be used, but another material may be used.

Next, the housing 5 is formed by bonding the first tubular member 51 and the second tubular member 52 to both ends of the third tubular member 53, and a main body of a module case is formed by attaching the rectifying tube 7. Then, the outer perimeter of the hollow fiber membrane bundle 3, one end of which has been sealed, is wrapped with the protective member 8, and the hollow fiber membrane bundle 3 wrapped with the protective member 8 is inserted to the housing 5. At this time, insertion is performed in such a manner that an end of the hollow fiber membrane bundle 3 with the sealed hollow portions is located near the second tubular member 52.

After then, column-shaped members are inserted to positions between the protective member 8 and the inner wall of the housing 5, where through-holes 20a are to be formed.

Next, adhesion fixing portions 20, 21 are formed by attaching a container for forming an adhesion fixing portion to both ends of the housing 5, and by injecting potting material to both ends of the housing 5. Then, after the adhesion fixing portions 20, 21 are formed, a plurality of through-holes 20a are formed by removing the column-shaped members near the adhesion fixing portion 20. Here, hollow portions of the hollow fiber membrane bundle 3 near the first tubular member 51 are closed by potting material.

The hollow fiber membrane bundle 3 and the housing 5 may be adhesively fixed to each other by centrifugal adhesion, which is performed while the housing 5 that has housed the hollow fiber membrane bundle 3 is rotated in a horizontal direction, or by stationary adhesion, which is performed by injecting potting material from the lower end of the housing 5 while the longitudinal direction of housing 5 is oriented in the vertical direction. The centrifugal adhesion is able to perform adhesion for both ends of the hollow fiber membrane bundle 3 at the same time, but requires a large amount of investment for equipment and electric power for high speed rotation. Meanwhile, the stationary adhesion needs to perform adhesion for each end of the hollow fiber membrane bundle 3 separately, and therefore, requires a longer period of time for adhesion. However, investment for large equipment is not required, and adhesion is possible by using simple tools. Here, after the potting material is cured, perfect cure at high temperature may be performed, if necessary.

Next, after the potting material in the housing 5 is confirmed to be cured, the container for forming an adhesion fixing portion is removed, and hollow portions of the hollow fiber membrane bundle 3 are opened by cutting off an end of the adhesion fixing portion 21, which is near the second tubular member 52.

Finally, caps 10, 11 for connecting piping are attached, through sanitary gaskets 12, to both ends of the housing 5, to which the hollow fiber membrane bundle 3 has been adhesively fixed. After the caps 10, 11 are fastened and fixed by clamps 13, a leakage test, a trial run and the like are conducted to check if production has been performed as regulated. Accordingly, the hollow fiber membrane module 1 is completed.

The column-shaped members set in the adhesion fixing portion 20 are removed after adhesion is completed, and the through-holes 20a are formed, as described above. Therefore, it is desirable that the length of the column-shaped members is longer than or equal to the thickness of the adhesion fixing portion 20.

Further, it is desirable that the leading end of the column-shaped member is tapered in the longitudinal direction, for example, in conic or pyramid shape. Such a tapered shape of the leading end of the column-shaped member can improve removal characteristics when the column-shaped member is pulled out during formation of the through-hole 20.

The cross-sectional shape of the column-shaped member is not particularly limited, and may be a polygon, such as a circle, an ellipse, a quadrangle, a hexagon and a sector, or a plate shape, for example. However, a circle or an ellipse, which does not have a risk of damaging the protective member 8 when the column-shaped member contacts with the protective member 8, is desirable.

Further, the size of the column-shaped member should be determined so as not to damage the protective member 8 when the column-shaped member is inserted to the housing 5, and also by considering operation characteristics during removal of the column-shaped member from the adhesion fixing portion 20. Specifically, the size is determined at any value from a range of 3 mm to the inner diameter of the protective member 8. Here, the term "size" of the column-shaped member means the diameter of a circle corresponding to a portion having the largest cross-sectional area in the longitudinal direction of the column-shaped member.

As the material of the column-shaped member, polymer materials, inorganic materials, metal materials and the like may be used, and not particularly limited. However, it is desirable to form the column-shaped member by using a material having low adhesion strength with the potting material and to make the structure of the column-shaped member detachable. Specifically, it is desirable that the cross-sectional shape of the column shaped member is a circle or an ellipse along the longitudinal direction.

Further, in the hollow fiber membrane module 1 of the above embodiment, the mesh protective member 8 was used, and substantially the whole outer perimeter of the hollow fiber membrane bundle 3 was wrapped. However, the protective member is not limited to the mesh member, and a sheet-type member in tubular shape may be used as the protective member. Note that when such a sheet-type protective member is used, it is desirable that the protective member is provided not on substantially the whole outer perimeter of the hollow fiber membrane bundle 3, but only at both ends of the hollow-fiber membrane bundle 3, or only at one end of the hollow fiber membrane bundle 3 to avoid a drop in filtration efficiency.

Further, it is desirable that the sheet-type member has flexibility, and that a heat-resistant material, such as polysulfone, polyethersulfone, polyimide-based resin and fluoro rubber, is used as the material of the sheet-type member.

Figure 5:
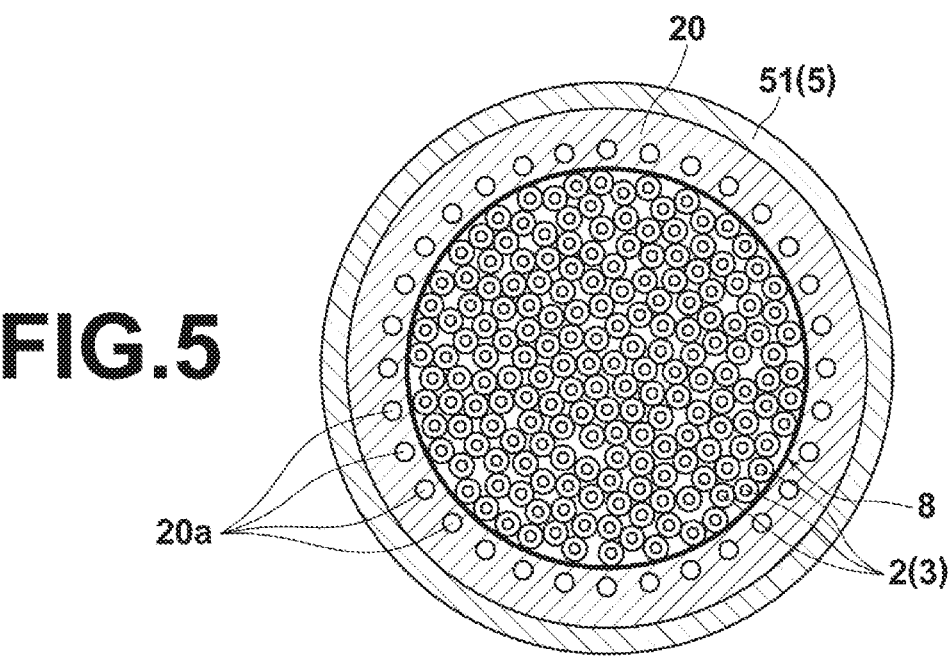
FIG. 5 A diagram illustrating another embodiment of through-holes

Further, in the hollow fiber membrane module 1 of the present embodiment, five through-holes 20a are provided. However, the number of the through-holes 20a is not limited to this number. As illustrated in FIG. 5, the size of the through-hole 20a may be reduced from the through-hole 20a illustrated in FIG. 2, and the number of the through-holes 20a may be increased. Even in this case, it is desirable that the through-holes 20a are provided along the outer perimeter surface of the hollow fiber bundle 3 at regular intervals, as illustrated in FIG. 5.

Figure 6:
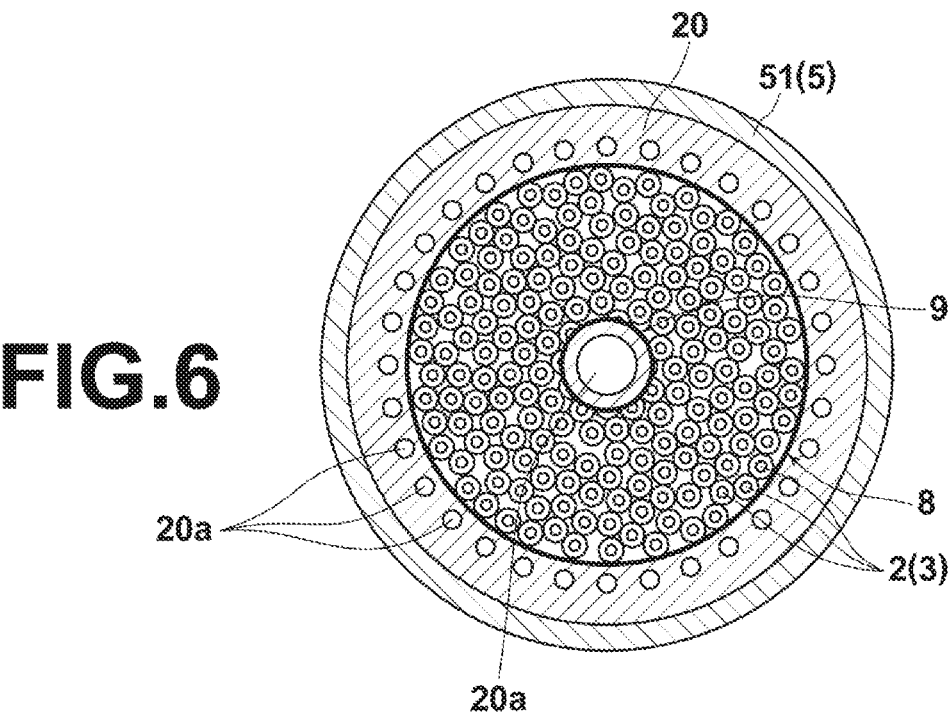
FIG. 6 A diagram illustrating another embodiment of through-holes
Figure 7:
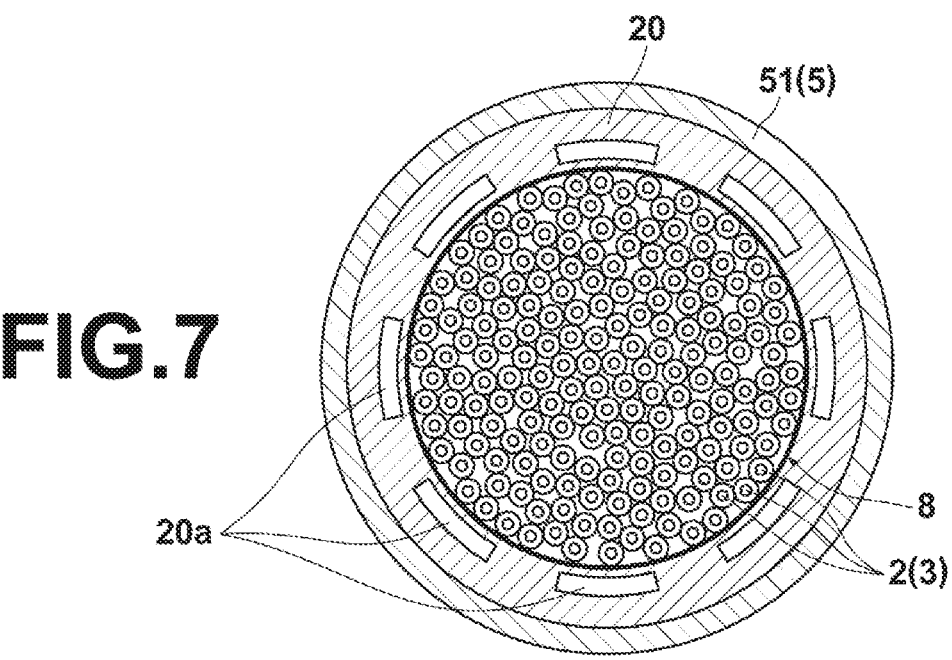
FIG. 7 A diagram illustrating another embodiment of through-holes

Further, in the hollow fiber membrane module 1 of the above embodiment, the through-holes 20a are provided only outside the outer perimeter of the hollow fiber membrane bundle 3. However, as illustrated in FIG. 6, a through-hole 20a may be provided also in the central part of the hollow fiber membrane bundle 3 having no hollow fiber membrane 2 arranged therein. It is possible to feed a larger amount of water to be treated by providing the through-hole 20a also in the central part of the hollow fiber membrane bundle 3 in this manner, and to achieve high flux.

However, since the water to be treated passes through the through-hole 20a formed in the central part of the hollow fiber membrane bundle 3, the hollow fiber membranes 2 in the central part of the hollow fiber membrane bundle 3 swing, and there is a risk of breaking the hollow fiber membranes 2. Therefore, when the through-hole 20a is provided in the central pan of the hollow fiber membrane bundle 3, the through-holes 20a are provided in such a manner that the total area of openings of through-holes provided outside the outer perimeter of the hollow fiber membrane bundle 3 is 80% or more of the total area of openings of all through-holes 20a. In the example illustrated in FIG. 6, the total area of openings of all through-holes 20a is the sum of the total area of openings of through-holes 20a provided outside the outer perimeter of the hollow fiber membrane bundle 3 and the area of the opening of the through-hole 20a provided in the central part of the hollow fiber membrane bundle 3.

Further, as illustrated in FIG. 6, when the through-hole 20a is provided also in the central part of the hollow fiber membrane bundle 3, it is desirable that a central protective member 9 is provided around the through-hole 20a. Further, it is desirable that the central protective member 9 extends from the lower adhesion fixing portion 20 to the upper adhesion fixing portion 21. Such a central protective member 9 can suppress the swing of the hollow fiber membranes 2 caused by passage of water to be treated through the through-hole 20a in the central part.

Further, in the hollow fiber membrane module 1 of the above embodiment, the openings of the through-holes 20a are circles, as illustrated in FIG. 2. However, the shape of the opening is not limited, and the opening of the through-hole 20a may be a rectangle extending along the outer perimeter of the hollow fiber membrane bundle 3, as illustrated in FIG.

7. Further, when the opening of the through-hole 20a is a rectangle in this manner, a through-hole 20a may be formed also in the central part of the hollow fiber membrane bundle 3, as illustrated in FIG. 8.

In the example illustrated in FIG. 6, when the through-hole 20a is provided also in the central part of the hollow fiber membrane bundle 3, the central protective member 9 is provided around the through-hole 20a. However, the manner of providing the protective member is not limited to this, and as in the example of FIG. 8, the hollow fiber membrane bundle 3 may be divided, for example, into four divided bundles 3a by segments passing through the center of the hollow fiber membrane bundle 3, and the outer perimeter of each of the divided bundles 3a may be wrapped with a protective member 8. It is possible to further suppress the swing of the hollow fiber membranes 2 caused by passage of water to be treated through the through-hole 20a in the central part by wrapping each of the divided bundles 3a with the protective member 8 in this manner. In the example illustrated in FIG. 8, the through-holes 20a are provided also in such a manner that the total area of openings of through-holes provided outside the outer perimeter of the hollow fiber membrane bundle 3 is 80% or more of the total area of openings of all through-holes 20a.

Figure 10:
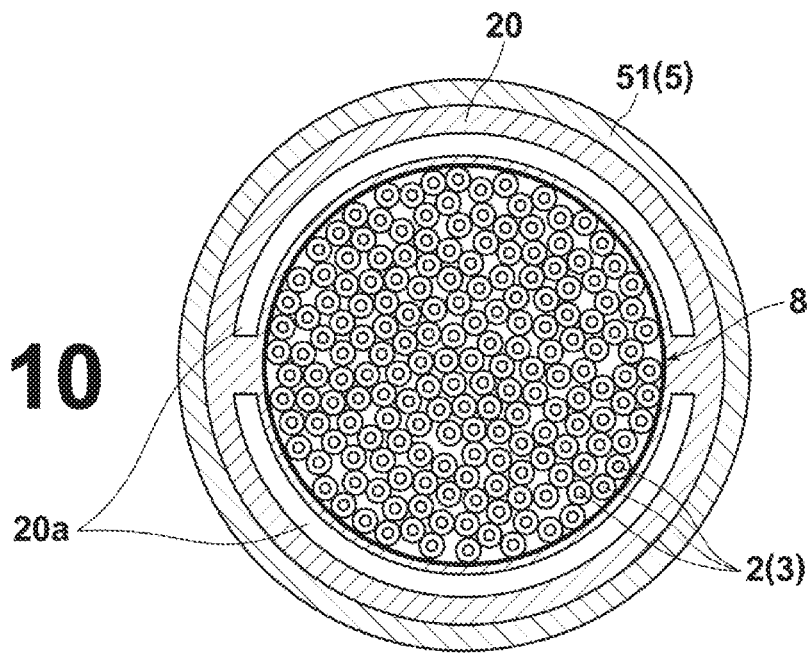
FIG. 10 A diagram illustrating another embodiment of through-holes

Further, the opening of the through-hole 20a may have a slit shape extending along the outer perimeter of the hollow fiber membrane bundle 3, as illustrated in FIG. 9, or a semicircular shape extending along the outer perimeter of the hollow fiber membrane bundle 3, as illustrated in FIG. 10.

Figure 11:
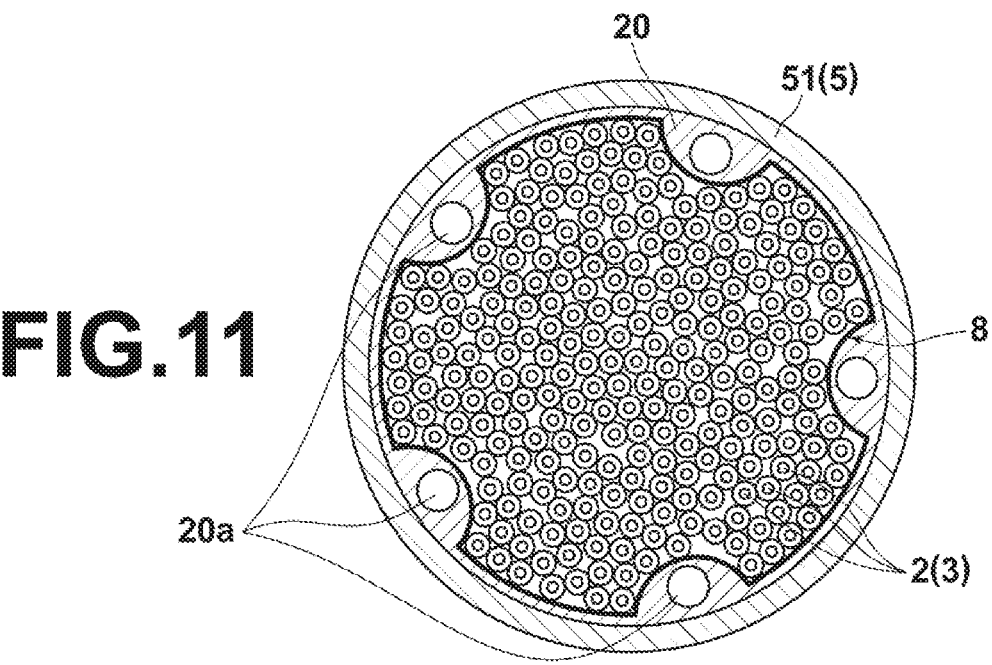
FIG. 11 A diagram illustrating another embodiment of through-holes
Figure 12:
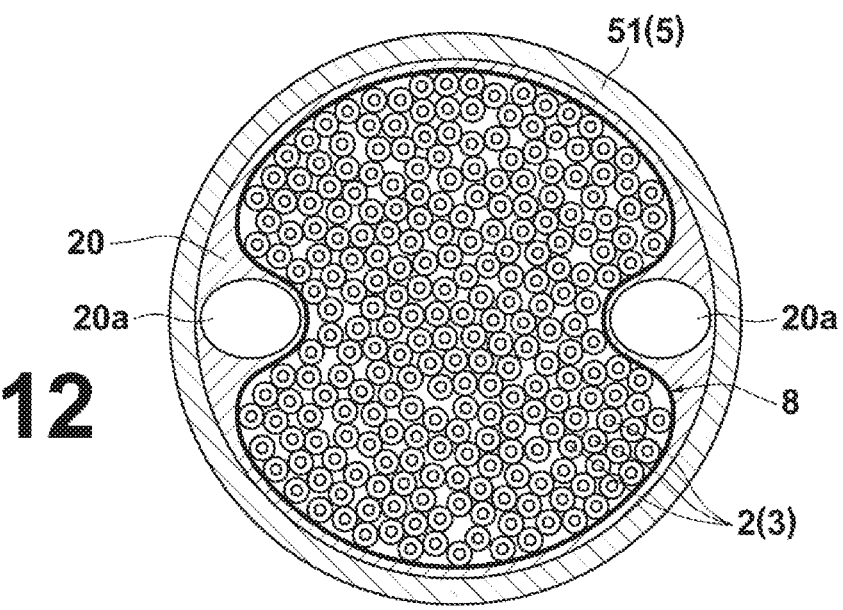
FIG. 12 A diagram illustrating another embodiment of through-holes

Further, as illustrated in FIG. 11, depressions may be formed on the outer perimeter of the hollow fiber membrane bundle 3, and through-holes 20a may be formed in the depressions. As a method for forming the through-holes 20a in the example illustrated in FIG. 11, for example, the hollow fiber membrane bundle 3 wrapped with the protective member 8 may be inserted to the housing 5, and after then, a plurality of column-shaped members may be inserted to appropriate positions outside the outer perimeter surface of the hollow fiber membrane bundle 3 wrapped with the protective member 8. In this case, the column-shaped members are inserted while being pressed toward the center of the hollow fiber membrane bundle 3 to form the depressions. Accordingly, it is possible to make the outer perimeter surface of the hollow fiber membrane bundle 3 and the protective member 8 in close contact with each other by a simple method, and to further suppress the swing of the hollow fiber membranes 2. In the example illustrated in FIG. 11, five through-holes 20a are formed. Alternatively, as illustrated in FIG. 12, two through-holes 20a may be formed in depressions on the outer perimeter of the hollow fiber membrane bundle 3.

Figure 13:
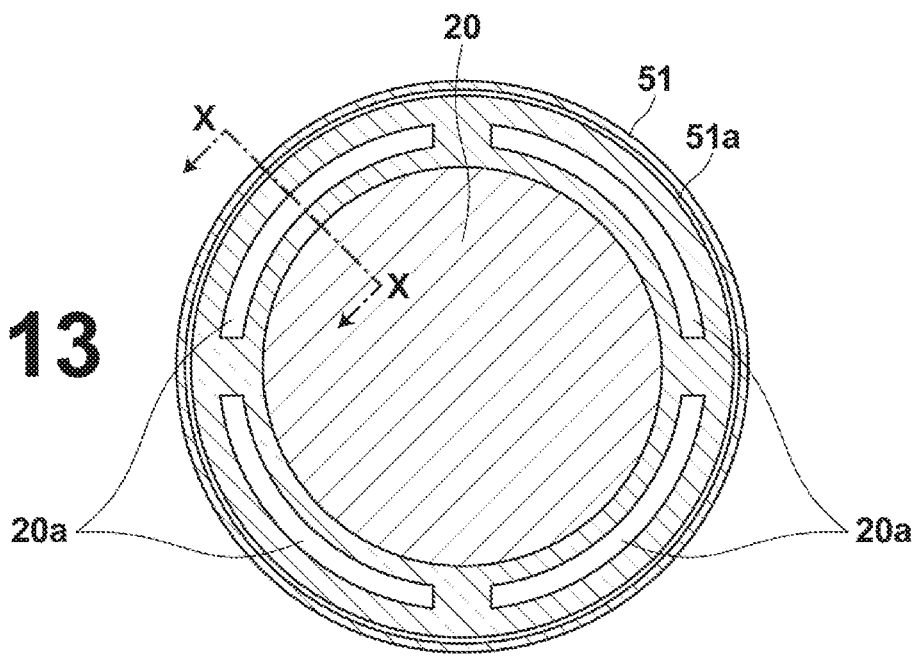
FIG. 13 A diagram illustrating an embodiment in which through-holes are provided in a housing FIG. 14 a cross-section at line X-X of FIG. 13
Figure 14:
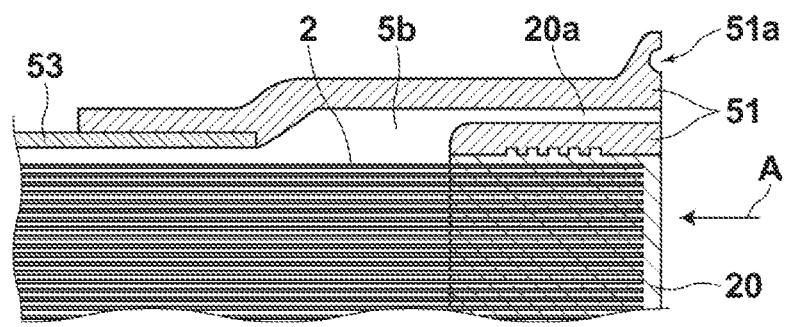

In the above descriptions, embodiments in which the through-holes 20a are provided in the lower adhesion fixing portion 20 were described. However, the present disclosure is not limited to these embodiments, the through-holes 20a may be formed for the housing 5. Specifically, for example, through-holes 20a may be provided in the first tubular member 51, which constitutes the housing 5. FIG. 13 is a diagram illustrating an example in which four rectangular through-holes 20a extending along the outer perimeter of the hollow fiber membrane bundle 3 are formed for the first tubular member 51. In FIG. 13, a groove 51a for a gasket in which a sanitary gasket is to be arranged is illustrated. Further, FIG. 14 is a cross-section at line X-X of FIG. 13. As illustrated in FIG. 14, the through-holes 20a are formed along the longitudinal direction of the first tubular member 51, and make the outside area 5b and the exterior area opposite to the outside area 5b with the adhesion fixing portion 20 therebetween communicate with each other. Note that FIG. 13 is a diagram viewed in the direction of arrow A in FIG. 14. Further, in the present embodiment, the housing 5 is formed by three members of the first tubular member 51, the second tubular member 52 and the third tubular member 53. Alternatively, for example, the third tubular member 53 and the first tubular member 51 may be integrated, and also in that case, the through-holes 20a may be provided in a portion corresponding to the first tubular member 51.

The through-hole 20a may be further provided in the central part of the hollow fiber membrane bundle 3 also in the examples illustrated in FIGS. 9 to 13. In this case, the through-holes 20a are provided also in such a manner that the total area of openings of through-holes 20a provided outside the outer perimeter of the hollow fiber membrane bundle 3 is 80% or more of the total area of openings of all through-holes 20a.

EXAMPLES

Next, examples and comparative examples of the outside-in hollow fiber membrane module of the present disclosure will be described. Table 1 and Table 2 at the end of the present specification show a production condition and a result of a filtration resistance test for each hollow fiber membrane module of Example 1 through Example 6 and Comparative Example 1 through Comparative Example 12.

Example 1

Next, steps for producing a hollow fiber membrane module of Example 1 will be described.

A hollow fiber membrane bundle 3 was fOrmed by bundling 2970 hollow fiber membranes (produced by ASAHI KASEI KABUSHIKI KAISHA) made of PS, and each having a sealed hollow portion at one end, and was inserted to a protection mesh (corresponding to the protective member 8) made of PFA in tubular shape having an inner diameter of 80 mm. Then, the hollow fiber membrane bundle 3 inserted to the protection mesh was inserted to a housing 5 having a first tubular member 51 and a second tubular member 52, with a rectifying tube 7 having an inner diameter of 83 mm attached to the inside thereof. The second tubular member 52 has a nozzle 52a with an inner diameter of 23 mm. The hollow fiber membrane 2 used in Example 1 has a molecular weight cut-off of 6000, an inner diameter of 0.75 mm, and an outer diameter of 1.35 mm.

Then, five cylindrical rods (corresponding to the column-shaped members) each having an outer diameter of 11 mm, and made of polyethylene were inserted and set between the protection mesh near the open hollow portions of the hollow fiber membrane bundle 3 and the inner wall of the housing 5. The cylindrical rods were inserted and arranged so as to be distributed at substantially regular intervals in the circumferential direction of the outer perimeter surface of the protection mesh.

Next, potting material was injected to the first and second tubular members 51, 52 by fixing a container for forming an adhesion fixing portion, and to which a tube for introducing potting material was attached, to both ends of the housing 5, and by fixing the housing 5 to a frame for centrifugal operations while a central axis of the nozzle 52a was directed to 45° with respect to the vertical downward direction, and the housing 5 was placed horizontally, and by rotating the housing 5 in horizontal direction. As the potting material, two-component curable epoxy resin was used. When cure reaction progressed and liquidation of the potting material stopped, the rotation of the centrifuge was stopped and the housing 5 was extracted, and heated to 90° C. in an oven to be cured.

After then, the hollow portions of the hollow fiber membrane bundle 3 that had been sealed in a stage before the adhesion step were opened by cutting the end of the housing 5, and at the other end, through-holes 20a were formed by removing the cylindrical rods made of polyethylene. At this time, the protection mesh was confirmed to be buried in the adhesion fixing portion 20, 21 made of potting material. Here, since all of the through-holes 20a of the hollow fiber membrane module of Example 1 are located outside the outer perimeter of the hollow fiber membrane bundle 3, the ratio of openings of through-holes in the outer perimeter portion is 100%. The ratio of openings of through-holes in the outer perimeter portion is calculated as follows:

{(Total Area of Openings of Through-Holes 20a outside Outer Perimeter of Hollow Fiber Membrane Bundle 3)/(Total Area of Openings of All Through-Holes 20a)}×100.

Next, after caps 10, 11 were fixed by clamps 13 through sanitary gaskets 12, the hollow fiber membrane module was attached to a filtration apparatus in such a manner that an end of the hollow fiber membrane module with the open hollow portions was placed upward, and the following filtration resistance test was conducted.

Operations of feeding clean water from the five throughholes 20a provided in the lower adhesion fixing portion 20 at 2.0 m$^3$/h in total, discharging filtrate from the hollow portions of the hollow fiber membrane bundle 3 in the upper adhesion fixing portion 21 at 1.5 m$^3$/h (set filtration flux), and discharging concentrate from the nozzle 52a on an upper side surface at 0.5 m$^3$/h were performed continuously for 24 hours a day for five days. After then, the number of leaked hollow fiber membranes 2 was checked by checking leakage, and the leaked hollow fiber membranes 2 were repaired by driving stainless nails into them. Then, after the hollow fiber membrane module after repair was set in the filtration apparatus again, operations of feeding clean water from the five through-holes 20a provided in the lower adhesion fixing portion 20 at 3.5 m$^3$/h in total, discharging filtrate from the hollow portions of the hollow fiber membrane bundle 3 in the upper adhesion fixing portion 21 at 3.1 m$^3$/h (set filtration flux), and discharging concentrate from the nozzle 52a on an upper side surface at 0.4 m$^3$/h were further performed continuously for 24 hours a day for five days. After then, the number of leaked hollow fiber membranes was checked by checking leakage.

Leakage was checked by removing the hollow fiber membrane module from the filtration apparatus, removing the cap 10, sealing the nozzle 52a, and immersing the whole hollow fiber membrane module in a horizontal position a water bath while air piping was connected to the conduit 11a. In this state, when air is gradually injected from the air piping until pressure reaches 0.05 MPa, air bubbles continuously emerge from the end of the hollow fiber membrane 2 with the open hollow portion, and the number of leaked hollow fiber membranes 2 is measurable.

No leaked hollow fiber membrane 2 was observed in both cases of the set filtration flux of 1.5 m$^3$/h and the set filtration flux of 3.1 m$^3$/h.

Example 2

In Example 2, a hollow fiber membrane module produced in a similar manner to Example 1, except that the total length of the protection mesh was 800 mm and the protection mesh was not buried in the adhesion fixing portion, was attached to the filtration apparatus, and a filtration resistance test was conducted under similar operation conditions to Example 1.

No hollow fiber membrane 2 leaked at the set filtration flux of 1.5 m$^3$/h, and only one hollow fiber membrane 2 leaked at the set filtration flux of 3.1 m$^3$/h.

Example 3

In Example 3, a hollow fiber membrane module produced in a similar manner to Example 1, except that the protection mesh was omitted, was attached to the filtration apparatus, and a filtration resistance test was conducted under similar operation conditions to Example 1.

No hollow fiber membrane 2 leaked at the set filtration flux of 1.5 m$^3$/h, and only three hollow fiber membranes 2 leaked at the set filtration flux of 3.1 m$^3$/h.

Example 4

In Example 4, four cylindrical rods (corresponding to the column-shaped members) each having an outer diameter of 11 mm, and made of polyethylene were inserted and set between the protection mesh near the open hollow portions of the hollow fiber membrane bundle 3 and the inner wall of the housing 5. The cylindrical rods were inserted and arranged so as to be distributed at substantially regular intervals in the circumferential direction of the outer perimeter surface of the protection mesh. Further, a cylindrical rod was set also in the central part of the hollow fiber membrane bundle 3. Except these features, a hollow fiber membrane module was produced in a similar manner to Example 1, and attached to the filtration apparatus, and a filtration resistance test was conducted under similar operation conditions to Example 1. Here, the ratio of openings of through-holes in the outer perimeter portion of the hollow fiber membrane module of Example 4 was 80%.

No hollow fiber membrane 2 leaked at the set filtration flux of 1.5 m$^3$/h, and only one hollow fiber membrane 2 leaked at the set filtration flux of 3.1 m$^3$/h.

Example 5

In Example 5, a hollow fiber membrane module produced in a similar manner to Example 4, except that the total length of the protection mesh was 800 mm and the protection mesh was not buried in the adhesion fixing portion, was attached to the filtration apparatus, and a filtration resistance test was conducted under similar operation conditions to Example 4.

No hollow fiber membrane 2 leaked at the set filtration flux of 1.5 m$^3$/h, and only three hollow fiber membranes 2 leaked at the set filtration flux of 3.1 m$^3$/h.

Example 6

In Example 6, a hollow fiber membrane module produced in a similar manner to Example 4, except that the protection mesh was omitted, was attached to the filtration apparatus, and a filtration resistance test was conducted under similar operation conditions to Example 4.

Only one hollow fiber membrane 2 leaked at the set filtration flux of 1.5 m$^3$/h, and only five hollow fiber membranes 2 leaked at the set filtration flux of 3.1 m$^3$/h.

Comparative Example 1

In Comparative Example 1, a hollow fiber membrane module produced in a similar manner to Example 1, except that two through-holes were provided outside the outer perimeter of the hollow fiber membrane bundle and three through-holes were provided inside the outer perimeter of the hollow fiber membrane bundle in such a manner that the ratio of openings of through-holes in the outer perimeter portion was 40%, was attached to the filtration apparatus, and a filtration resistance test was conducted under similar operation conditions to Example 1.

No leaked hollow fiber membrane 2 was observed at the set filtration flux of 1.5 m$^3$/h, but 12 hollow fiber membranes 2 leaked at the set filtration flux of 3.1 m$^3$/h.

Comparative Example 2

In Comparative Example 2, a hollow fiber membrane module produced in a similar manner to Comparative Example 1, except that the total length of the protection mesh was 800 mm and the protection mesh was not buried in the adhesion fixing portion, was attached to the filtration apparatus, and a filtration resistance test was conducted under similar operation conditions to Example 1.

Five hollow fiber membranes 2 leaked at the set filtration flux of 1.5 m$^3$/h, and 22 hollow fiber membranes 2 leaked at the set filtration Mux of 3.1 m$^3$/h.

Comparative Example 3

In Comparative Example 3, a hollow fiber membrane module produced in a similar manner to Comparative Example 1, except that the protection mesh was omitted, was attached to the filtration apparatus, and a filtration resistance test was conducted under similar operation conditions to Example 1.

Five hollow fiber membranes 2 leaked at the set filtration flux of 1.5 m$^3$/h, and 29 hollow fiber membranes 2 leaked at the set filtration flux of 3.1 m$^3$/h.

Comparative Example 4

In Comparative Example 4, a hollow fiber membrane module produced in a similar manner to Example 1, except that through-holes were provided only inside the outer perimeter of the hollow fiber membrane bundle, so that the ratio of openings of through-holes in the outer perimeter portion was 0%, was attached to the filtration apparatus, and a filtration resistance test was conducted under similar operation conditions to Example 1.

No leaked hollow fiber membrane 2 was observed at the set filtration flux of 1.5 m$^3$/h, but 25 hollow fiber membranes 2 leaked at the set filtration flux of 3.1 m$^3$/h.

Comparative Example 5

In Comparative Example 5, a hollow fiber membrane module produced in a similar manner to Comparative Example 4, except that the total length of the protection mesh was 800 mm and the protection mesh was not buried in the adhesion fixing portion, was attached to the filtration apparatus, and a filtration resistance test was conducted under similar operation conditions to Example 1.

Six hollow fiber membranes 2 leaked at the set filtration flux of 1.5 m$^3$/h, and many hollow fiber membranes 2 leaked at the set filtration flux of 3.1 m$^3$/h.

Comparative Example 6

In Comparative Example 6, a hollow fiber membrane module produced in a similar manner to Comparative Example 4, except that the protection mesh was omitted, was attached to the filtration apparatus, and a filtration resistance test was conducted under similar operation conditions to Example 1.

Four hollow fiber membranes 2 leaked at the set filtration flux of 1.5 m$^3$/h, and many hollow fiber membranes 2 leaked at the set filtration flux of 3.1 m$^3$/h.

Comparative Example 7

In Comparative Example 7, unlike Example 1 through Example 6, which used hollow fiber membrane modules having through-holes formed in adhesion fixing portions, a conventional hollow fiber membrane module, to which water to be treated is fed from a nozzle formed on the side surface of the housing, was used, and a filtration resistance test was conducted under similar operation conditions to Example 1. Note that the hollow fiber membrane module of Comparative Example 7 has a similar structure to the hollow fiber membrane module of Example 1, except that the water to be treated is fed from a different position.

Two hollow fiber membranes 2 leaked at the set filtration flux of 1.5 m$^3$/h, but 28 hollow fiber membranes 2 leaked at the set filtration flux of 3.1 m$^3$/h.

Comparative Example 8

In Comparative Example 8, a hollow fiber membrane module produced in a similar manner to Comparative Example 7, except that the protection mesh was not buried in the adhesion fixing portion, was used, and a filtration resistance test was conducted under similar operation conditions to Example 1.

12 hollow fiber membranes 2 leaked at the set filtration flux of 1.5 m$^3$/h, and many hollow fiber membranes 2 leaked at the set filtration flux of 3.1 m$^3$/h.

Comparative Example 9

In Comparative Example 9, a hollow fiber membrane module produced in a similar manner to Comparative Example 7, except that the protection mesh was not omitted, was used, and a filtration resistance test was conducted under similar operation conditions to Example 1.

15 hollow fiber membranes 2 leaked at the set filtration flux of 1.5 m$^3$/h, and many hollow fiber membranes 2 leaked at the set filtration flux of 3.1 m$^3$/h.

Comparative Example 10

In Comparative Example 10, unlike Example 1 through Example 6, which used hollow fiber membrane modules having through-holes formed in adhesion fixing portions, a hollow fiber membrane module similar to a conventional product, in which hollow portions of the hollow fiber membranes at both ends were open, and water to be treated was fed from hollow portions of the open hollow fiber membranes at the lower adhesion fixing portion 20, and treated water was discharged from a nozzle 52a on the upper side surface, and concentrate was discharged from open hollow portions of hollow fiber membranes in the upper adhesion fixing portion 21, was used, and a filtration resistance test was conducted under similar operation conditions to Example 1. Note that the hollow fiber membrane module of Comparative Example 10 has a similar structure to the hollow fiber membrane module of Example 1, except that the water to be treated is fed from a different position.

No leaked hollow fiber membrane 2 was observed at the set filtration flux of 1.5 m³/h, but 21 hollow fiber membrane 2 leaked at the set filtration flux of 3.1 m³/h.

Comparative Example 11

In Comparative Example 11, a hollow fiber membrane module produced in a similar manner to Comparative Example 10, except that the protection mesh was not buried in the adhesion fixing portion, was used, and a filtration resistance test was conducted under similar operation conditions to Example 1.

One hollow fiber membrane 2 leaked at the set filtration flux of 1.5 m³/h, and many hollow fiber membrane 2 leaked at the set filtration flux of 3.1 m³/h.

Comparative Example 12

In Comparative Example 12, a hollow fiber membrane module produced in a similar manner to Comparative Example 10, except that the protection mesh was omitted, was attached to the filtration apparatus, and a filtration resistance test was conducted under similar operation conditions to Example 1.

No leaked hollow fiber membrane 2 was observed at the set filtration flux of 1.5 m³/h, but many hollow fiber membranes 2 leaked at the set filtration flux of 3.1 m³/h.

TABLE 3

| Production Conditions and Set FLUX | | Comparative Example 10 | Comparative Example 11 | Comparative Example 12 |
|---|---|---|---|---|
| Presence of Protective Member | | YES | YES | NO |
| Protective Member Buried in Adhesion Fixing Portion | | Buried | Not Buried | — |
| Set Filtration Flux (m³/h) | 1.5 | 0 | 1 | 0 |
| | 3.1 | 21 | many | many |

Note:
"YES" means present, and "NO" means not present.

EXPLANATION OF THE REFERENCE NUMERALS 1 hollow fiber membrane module
2 hollow fiber membrane
3 hollow fiber membrane bundle
3a divided bundles
5 housing
5a ring-shaped uneven portion
5b outside area
5c exterior area
7 rectifying tube
7a flange

TABLE 1

| Production Conditions and Set FLUX | | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|---|---|
| Ratio of Openings of Through-holes in Outer Perimeter Portion (%) | | 100 | | 80 | | 40 | | | 0 | | | | |
| Presence of Protective Member | | YES | NO | YES | NO | YES | NO | YES | NO | | | | |
| Protective Member Buried in Adhesion Fixing Portion | | Buried | Not Buried | — | Buried | Not Buried | — | Buried | Not Buried | — | Buried | Not Buried | — |
| Set Filtration Flux (m³/h) | 1.5 | 0 | 0 | 0 | 0 | 0 | 1 | 0 | 5 | 5 | 0 | 6 | 4 |
| | 3.1 | 0 | 1 | 3 | 1 | 3 | 5 | 12 | 22 | 29 | 25 | many | many |

Note:
"Ex." represents Example,
"Com. Ex." represents Comparative Example,
"YES" means present, and
"NO" means not present.

TABLE 2

| Production Conditions and Set FLUX | | Comparative. Example 7 | Comparative Example 8 | Comparative Example 9 |
|---|---|---|---|---|
| Presence of Protective Member | | YES | | NO |
| Protective Member Buried in Adhesion Fixing Portion | | Buried | Not Buried | — |
| Set Filtration Flux (m³/h) | 1.5 | 2 | 12 | 15 |
| | 3.1 | 28 | many | many |

Note:
"YES" means present, and "NO" means not present.

8 protective member
9 central protective member
10, 11 caps
10a, 11a conduits
12 sanitary gasket
13 clamp
20, 21 adhesion fixing portions
20a through-hole
30 through hole
51 first tubular member
52 second tubular member
52a nozzle
53 third tubular member

The invention claimed is:
1. A hollow fiber membrane module, comprising:
a hollow fiber membrane bundle of a plurality of hollow fiber membranes bundled together, and the hollow fiber membrane bundle having closed hollow portions at one end and open hollow portions at another end;

a tubular housing that houses the hollow fiber membrane bundle;

an inlet conduit provided at one end of the housing and an outlet conduit provided at another end of the housing;

a first adhesion fixing portion that adhesively fixes the hollow fiber membranes together and the hollow fiber membrane bundle and an inner wall of the housing together at the open end of the hollow fiber membranes;

a second adhesion fixing portion that adhesively fixes the hollow fiber membranes together and the hollow fiber membrane bundle and the inner wall of the housing together at the closed end of the hollow fiber membranes; and a space provided between an inner surface of the housing and an outer perimeter of the hollow fiber membrane bundle, wherein the space extends axially between the first adhesion fixing portion and the second adhesion fixing portion, wherein the second adhesion fixing portion has at least one through-hole for introducing liquid fed from the outside of the second adhesion fixing portion by the inlet conduit into the space, and wherein all of the through-holes are provided outside the outer perimeter of the hollow fiber membrane bundle.

2. The hollow fiber membrane module, as defined in claim 1, wherein a protective member is provided between the hollow fiber membrane bundle and the at least one through-hole provided outside the outer perimeter of the hollow fiber membrane bundle.

3. The hollow fiber membrane module, as defined in claim 2, wherein the protective member wraps the outer perimeter of the hollow fiber membrane bundle.

4. The hollow fiber membrane module, as defined in claim 2, wherein the protective member is fixed at at least one of the first adhesion fixing portion and the second adhesion fixing portion.

5. The hollow fiber membrane module, as defined in claim 4, wherein the protective member is fixed by the first adhesion fixing portion.

6. The hollow fiber membrane module, as defined in claim 4, wherein the protective member is fixed by the second adhesion fixing portion.

7. The hollow fiber membrane module, as defined in claim 2, wherein the protective member is a mesh member in tubular shape.

8. The hollow fiber membrane module, as defined in claim 1, wherein the at least one through-hole is a plurality of through-holes provided at regular intervals along the outer perimeter of the hollow fiber membrane bundle.

9. The hollow fiber membrane module, as defined in claim 1, wherein the opening of the at least one through-hole has a shape extending along the outer perimeter of the hollow fiber membrane bundle.

10. A filtration method using a hollow fiber membrane module according to claim 1, the method comprising:

feeding liquid to be treated from the outside of each of the hollow fiber membranes; and obtaining filtrate from a hollow portion of each of the hollow fiber membranes, wherein the liquid to be treated is fed, in a longitudinal direction of the hollow fiber membrane bundle, in an area outside the outer perimeter of the hollow fiber membrane bundle.

11. The filtration method, as defined in claim 10, wherein the liquid to be treated is fed at a plurality positions outside the outer perimeter of the hollow fiber membrane bundle.

12. The filtration method, as defined in claim 10, wherein the liquid to be treated passes through each of the hollow fiber membranes after passing through a protective member provided outside the outer perimeter of the hollow fiber membrane bundle.

13. The filtration method, as defined in claim 12, wherein the liquid to be treated passes through the protective member after passing through a through-hole or through-holes formed in an adhesion fixing portion that adhesively fixes the hollow fiber membranes together and the hollow fiber membrane bundle and an inner wall of the housing together at an end of the hollow fiber membrane bundle.

14. The filtration method, as defined in claim 10, wherein the liquid to be treated is fed from a conduit formed outside the adhesion fixing portion.

15. The hollow fiber membrane module as defined in claim 1, wherein:

the at least one through-hole is a plurality of the through-holes that are circular and distributed at equidistant intervals in the circumferential direction of the outer perimeter of the hollow fiber membrane bundle.

16. A filtration method using a hollow fiber membrane module comprising:

a hollow fiber membrane bundle of a plurality of hollow fiber membranes bundled together, and the hollow fiber membrane bundle having closed hollow portions at one end and open hollow portions at another end;

a tubular housing that houses the hollow fiber membrane bundle;

an inlet conduit provided at one end of the housing and an outlet conduit provided at another end of the housing;

a first adhesion fixing portion that adhesively fixes the hollow fiber membranes together and the hollow fiber membrane bundle and an inner wall of the housing together at the open end of the hollow fiber membranes;

a second adhesion fixing portion that adhesively fixes the hollow fiber membranes together and the hollow fiber membrane bundle and the inner wall of the housing together at the closed end of the hollow fiber membranes; and a space provided between an inner surface of the housing and an outer perimeter of the hollow fiber membrane bundle, wherein the space extends axially between the first adhesion fixing portion and the second adhesion fixing portion, wherein the second adhesion fixing portion has at least one through-hole for introducing liquid fed from the outside of the second adhesion fixing portion by the inlet conduit into the space, and wherein all of the through-holes are provided outside the outer perimeter of the hollow fiber membrane bundle, the method comprising:

feeding liquid, through the at least one through-hole, into the space; and causing filtrate obtained by filtration by the hollow fiber membranes to flow out from the open hollow portions of the hollow fiber membranes.

17. The hollow fiber membrane module as defined in claim 15, wherein the plurality of through-holes are five in number.

* * * * *

UNITED STATES PATENT AND TRADEMARK OFFICE
CERTIFICATE OF CORRECTION

PATENT NO. : 11,273,412 B2
APPLICATION NO. : 16/483942
DATED : March 15, 2022
INVENTOR(S) : N. Morita It is certified that error appears in the above-identified patent and that said Letters Patent is hereby corrected as shown below:

In the Claims

At Column 20, (Claim 11, Line 2), please change "positions" to -- of positions --.

Signed and Sealed this
Twentieth Day of December, 2022

Katherine Kelly Vidal
*Director of the United States Patent and Trademark Office*